(12) United States Patent
Li et al.

(10) Patent No.: US 8,785,768 B2
(45) Date of Patent: Jul. 22, 2014

(54) METHOD FOR VERTICALLY GROUNDING AND LEADING DOWN FROM OUTER SIDE OF COMPOSITE MATERIAL POLE TOWER AND POLE TOWER THEREOF

(75) Inventors: Hanming Li, Shenzhen (CN); Zhijun Li, Wuhan (CN); Qianhu Wei, Shenzhen (CN); Ting Liu, Wuhan (CN); Shicong Deng, Shenzhen (CN); Feng Huo, Wuhan (CN); Ming Zhan, Shenzhen (CN); Min Dai, Wuhan (CN); Weicai Zhou, Shenzhen (CN); Kai Liu, Wuhan (CN); Yuhua Zhang, Shenzhen (CN); Xiong Wu, Wuhan (CN); Ning Cao, Shenzhen (CN); Dingxie Gu, Hubei (CN); Peihong Zhou, Shenzhen (CN); Huiwen He, Wuhan (CN); Ying Lou, Wuhan (CN); Zhenqiang Li, Wuhan (CN)

(73) Assignees: Shenzhen Power Supply Burea of Guangdong Power Grid Corp., Shenzhen, Guangdong (CN); State Grid Electric Power Research Institute, Wuhan, Hubei (CN)

( * ) Notice: Subject to any disclaimer, the term of this patent is extended or adjusted under 35 U.S.C. 154(b) by 201 days.

(21) Appl. No.: 13/395,103

(22) PCT Filed: May 5, 2010

(86) PCT No.: PCT/CN2010/072442
§ 371 (c)(1),
(2), (4) Date: Mar. 8, 2012

(87) PCT Pub. No.: WO2011/029311
PCT Pub. Date: Mar. 17, 2011

(65) Prior Publication Data
US 2012/0168193 A1   Jul. 5, 2012

(30) Foreign Application Priority Data

Sep. 8, 2009 (CN) .......................... 2009 1 0063896
Jan. 28, 2010 (CN) .......................... 2010 1 0116972

(51) Int. Cl.
*H01R 4/66* (2006.01)

(52) U.S. Cl.
USPC .................... 174/6; 174/5 R; 174/2; 361/117; 361/1

(58) Field of Classification Search
USPC ........ 174/1, 2, 3, 5 R, 5 SB, 5 SG, 6, 7, 45 R, 174/40 R, 44, 78; 361/117, 1; 248/218.4, 248/200, 205.1
See application file for complete search history.

(56) References Cited

U.S. PATENT DOCUMENTS 357,050 A * 2/1887 Vail ................................... 174/2
3,621,107 A * 11/1971 Duvendack ....................... 174/6

(Continued)

*Primary Examiner* — Angel R Estrada
(74) *Attorney, Agent, or Firm* — Raymond Y. Chan; David and Raymond Patent Firm

(57) ABSTRACT

A method for vertically grounding and leading down form an outer side of a composite pole tower and pole tower thereof, wherein the method includes the following steps: extending an upper metal cross arm from an extended line of at least one side of a ground wire cross arm, vertically leading down a ground down-leading wire from a distal end of the upper metal cross arm, connecting the ground down-leading wire to the pole tower via a lower metal cross arm at a distance under a lower lead, and grounding the ground down-leading wire along a tower body of the pole tower, wherein when an lower portion of the tower body is a metal pipe, the ground down-leading wire is selectively directly connected to the metal pipe via the lower metal cross arm. The method facilitates in compressing the width of the transmission corridor to a maximum extent as well as designing a lightning protection, preventing the ground down-leading wire from short-circuiting with the tower body, and realizing the insulation function of the composite material tower body. The manner of using unilateral ground down-leading wire saves material, and is economical and simple in structure.

2 Claims, 4 Drawing Sheets

(56) References Cited

U.S. PATENT DOCUMENTS

| | | | |
|---|---|---|---|
| 6,142,434 A * | 11/2000 | Trost et al. | 248/218.4 |
| 6,431,885 B1 * | 8/2002 | Stroup | 174/78 |
| 6,815,607 B1 * | 11/2004 | Gingras | 174/7 |
| 7,701,688 B2 * | 4/2010 | Jeon | 361/117 |
| 2005/0178570 A1 * | 8/2005 | King et al. | 174/45 R |
| 2012/0018213 A1 * | 1/2012 | Gomez Vanegas et al. | 174/45 R |

* cited by examiner

METHOD FOR VERTICALLY GROUNDING AND LEADING DOWN FROM OUTER SIDE OF COMPOSITE MATERIAL POLE TOWER AND POLE TOWER THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention is in a field related to application of electricity transmission technology of an electric power system. And more particularly, the present invention relates to a method for vertically grounding and leading down form an outer side of a composite pole tower and pole tower thereof.

2. Description of Related Arts

Pole towers are important instruments in an electric transmission line. The property of material of pole powers has a direct influence on safety, economy, and reliability of operation of the electric transmission line. Since raw steel material has a high intensity and good weight ratio, pole powers of high voltage electric transmission line at home and abroad are mostly made of raw steel material. However, pole powers of raw steel material also have disadvantages such as being massive (density of the raw steel material is high) and easy to corrupt. And thus a lot of manpower and materials are required for construction, transport and maintenance of the pole towers. With the development of the composite materials, advantages such as light weight, high intensity, corrosion-resistant, bearable in high temperature and low temperature, durable, and good insulating property have been found in composite materials. Therefore, poles powers of composite material, which have advantages such as low cost of transporting (especially in a sparsely populated area), antifouling, corrosion-resistant and the like, have good utilication prospects. It should be noted that pole towers of composite material have already been widely used in some areas in Canada and America.

However, lightning protection is not an issue when the pole towers of composite material are used in Canada and America. The mainly reason is that these areas using pole towers of composite material do not suffered a lot from lightning (For these areas in Canada and America have long winters, and lightning days are very few). Furthermore, the electric transmission lines are of low voltage which is mostly lower than 110 kv and do not required grounding. In addition, influence of lightning on the system is not vital because the voltage is relatively low.

Recently, pole towers in China are made of reinforced concrete, wood or raw steel (a pole tower in the rank of high voltage which is more than 110 kv often is made of raw steel). Because of the outstanding property of composite material, many regions in China also begins to use composite material (for pole towers in the rank of high voltage which are more than 110 kv). However, in these regions of China, issues such as much efforts have been put on building the transmission corridor, lightning takes place frequently, and contamination should be concerned, so that when the pole towers of composite material are employed to these regions, focus should be put on reducing a width of the transmission corridor (reduce the maximum distance between the leads of the transmission line), avoiding damage by lightning (reduce the possibility of destroy by lightning), and preventing contamination (reduce the possibility of running out of order because of pollution flashover by increasing a climbing distance of the the pollution flashover).

In order to prevent the pole towers from damage by lightning, ground wires should be installed to the transmission line (the pole towers in Canada and America have not been provided with ground wires because it is not a issue in these regions of these countries). The pole towers of composite material should be grounded to release lightning energy of the ground wires (lightning conductor) or tower peak during lightning so as to increase ability lightning protection of the pole towers.

Therefore, in a region in which lightning takes place frequently, grounding should be carefully taken in consideration when pole towers of composite material are applied in use (since the body itself of a steel pole tower is a metal conductor, ground wires are directly electrically connected to the earth through the body of the pole tower, so that grounding is not an issue for a steel pole tower). There are several kinds of grounding and leading-down methods which directly have influence on performance of lightning protection, reducing the width of the transmission line and contamination prevention, so that methods of grounding and leading-down are important and key issues that should be solved when the pole towers of composite material are in application.

SUMMARY OF THE PRESENT INVENTION

A main object of the present invention is to provide a method for vertically grounding and leading down form an outer side of a composite pole tower and pole tower thereof, so that advantage of the insulating property of the composite material of the pole towers is realized, and the present invention further has advantages such as reducing the width of transmission corridor and preventing damage by lightning and contamination by pollution flashover.

Additional advantages and features of the invention will become apparent from the description which follows, and may be realized by means of the instrumentalities and combinations particular point out in the appended claims.

According to the present invention, the foregoing and other objects and advantages are attained by a method for vertically grounding and leading down form an outer side of a composite pole tower, wherein the method comprises the following steps: extend an upper metal cross arm from an extended line of at least one side of a ground wire cross arm, vertically lead down a ground down-leading wire from a distal end of the upper metal cross arm, connect the ground down-leading wire to the pole tower via a lower metal cross arm at a distance under a lower lead, ground the ground down-leading wire along a tower body of the pole tower, wherein when an lower portion of the tower body is a metal pipe, the ground down-leading wire is selectively directly connected to the metal pipe via the lower metal cross arm.

Preferably, extend two upper metal cross arms from extended lines of two sides of the ground wire cross arm respectively, and vertically lead down two ground down-leading wires from the distal ends of the two upper metal cross arms respectively.

Preferably, the ground down-leading wires and the tower body are supported therebetween by at least an insulating arm or a composite insulator, so that the ground down-leading wires are not easy to bend nor deform when suffering impact from wind during operation.

In accordance with another aspect of the invention, the present invention provides a composite pole tower which grounds from an outer side thereof, the pole tower comprises a tower body, a ground wire cross arm, an upper metal cross arm extended from an extended line of at least one side of the ground wire cross arm, a ground down-leading wire vertically extended from a distal end of the upper metal cross arm, a lower metal cross arm, wherein the ground down-leading wire is connected to the pole tower via the lower metal cross arm at a distance under a lower current lead of the pole tower, wherein the ground down-leading wire is grounded along the tower body of the pole tower, wherein when an lower portion of the tower body is a metal pipe, the ground down-leading wire is selectively directly connected to the metal pipe via the lower metal cross arm.

Preferably, two upper metal cross arms are extended from extended lines of two sides of the ground wire cross arm respectively, wherein two ground down-leading wires are vertically leaded down from the distal ends of the two upper metal cross arms respectively.

Preferably, the ground down-leading wires and the tower body are supported therebetween by at least an insulating arm or a composite insulator, so that the ground down-leading wires are not easy to bend nor deform when suffering impact from wind during operation.

The present invention has following advantages.

Firstly, the width of the transmission corridor, which has influence on the lightning outage rate between different phases or lightning outage rate at double parallel lines, is reduced.

Secondly, having benefits in design of lightning protection. Adjusting the minimum distance between the proximate current lead and the ground down-leading wire can control the insulating intensity of the current lead of a single line when suffering a lightning. Furthermore, the manner of unilateral grounding from one side of pole tower also results in an unbalanced insulating between the two parallel lines, so that the lightning outage rate at double parallel lines is greatly reduced.

Thirdly, preventing the ground down-leading wire from short-circuiting with the tower body of the composite pole tower, so that advantage of the insulating property of the composite material of the pole towers is realized, and distance of the current lead climbing from the earth is increased, so that the ability of avoiding influence of pollution flashover is enhanced.

Fourthly, the ground down-leading wires are not pulled out to be at a position above surface of the earth, so that inconvenience to daily life of people is prevented.

Fifthly, it is material-saving and economical to use the manner of grounding from one side of the pole tower.

Sixthly, the structure is simple and easy to achieve.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
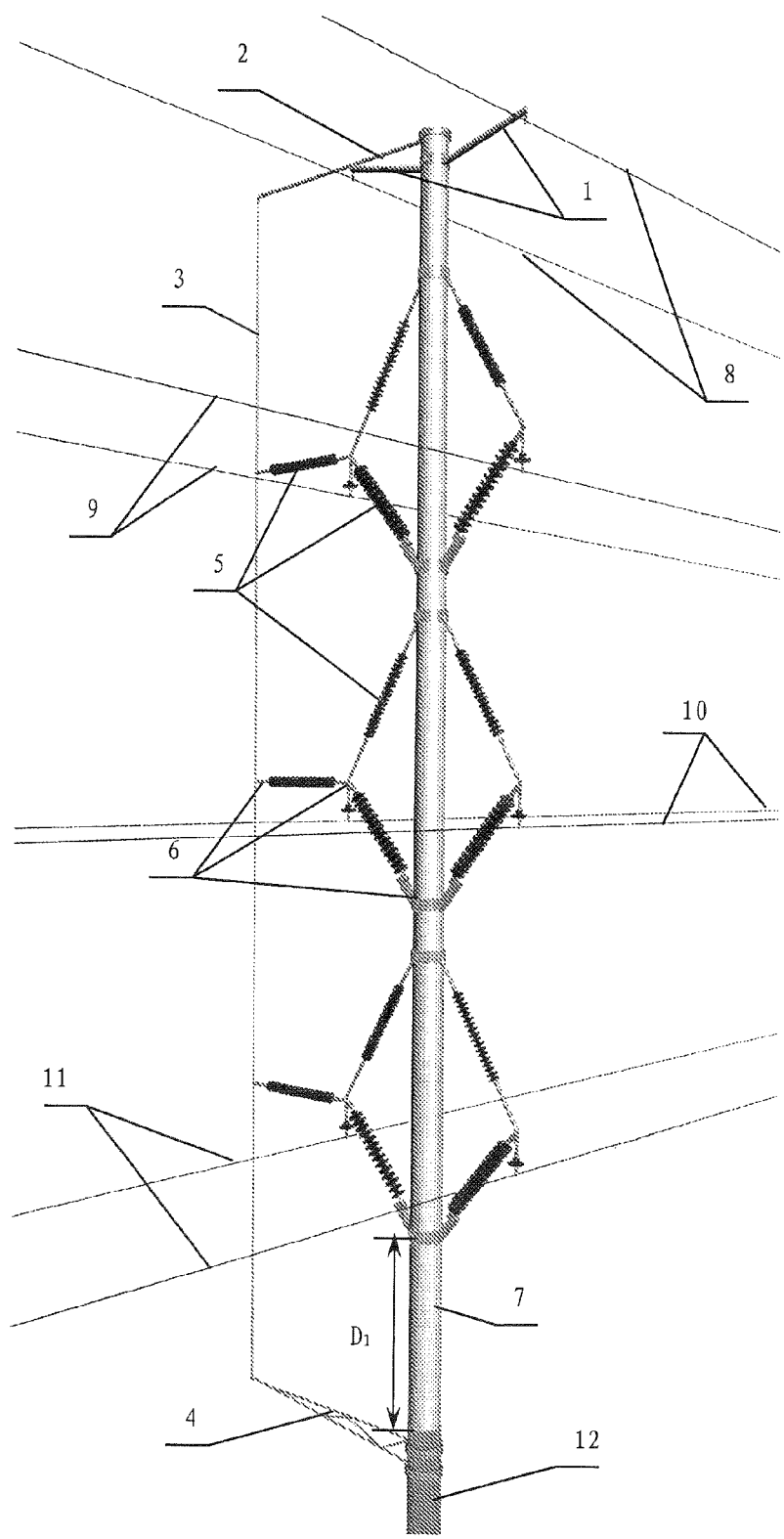
FIG. 1 is a front view of a pole tower using unilateral ground down-leading wire according to a preferred embodiment of the present invention.
Figure 2:
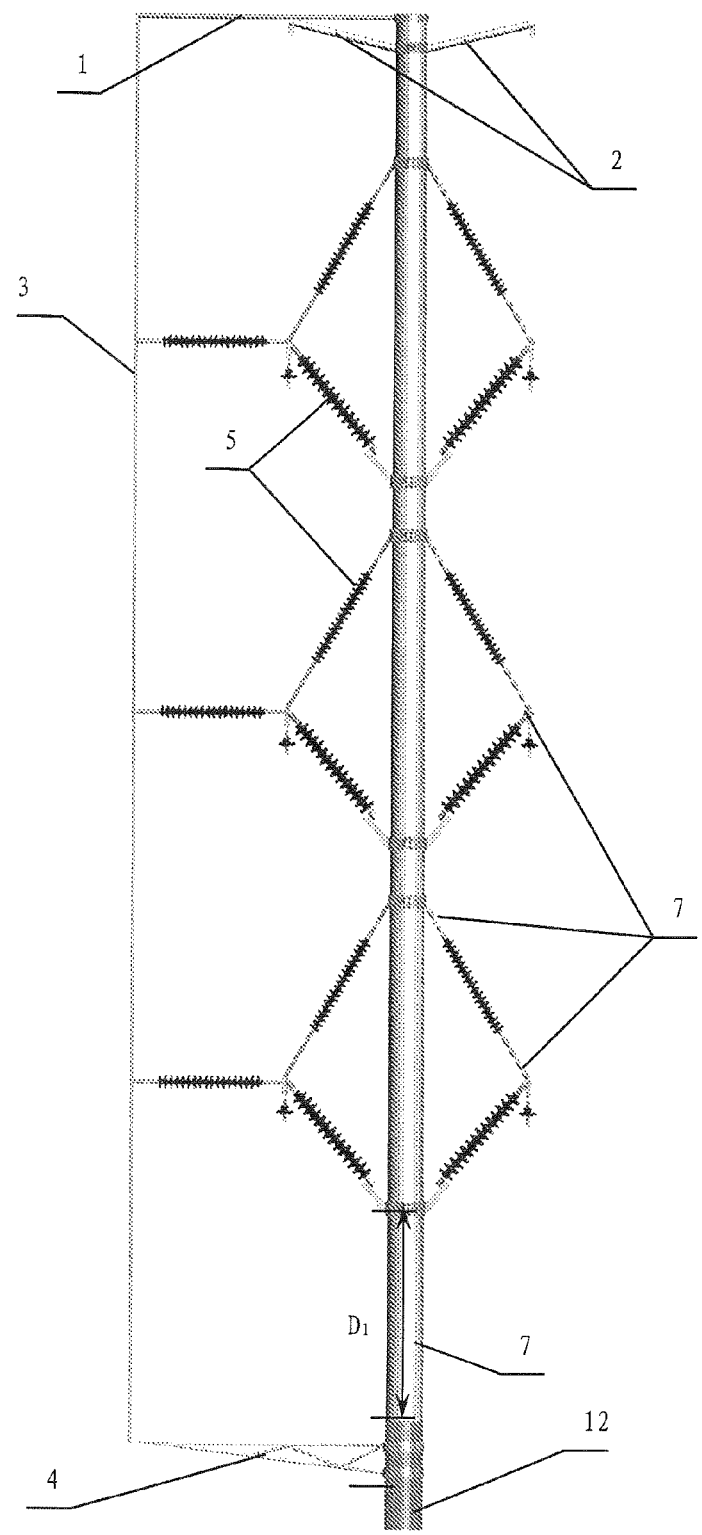
FIG. 2 is a perspective view of the pole tower according to the above preferred embodiment of the present invention.
Figure 3:
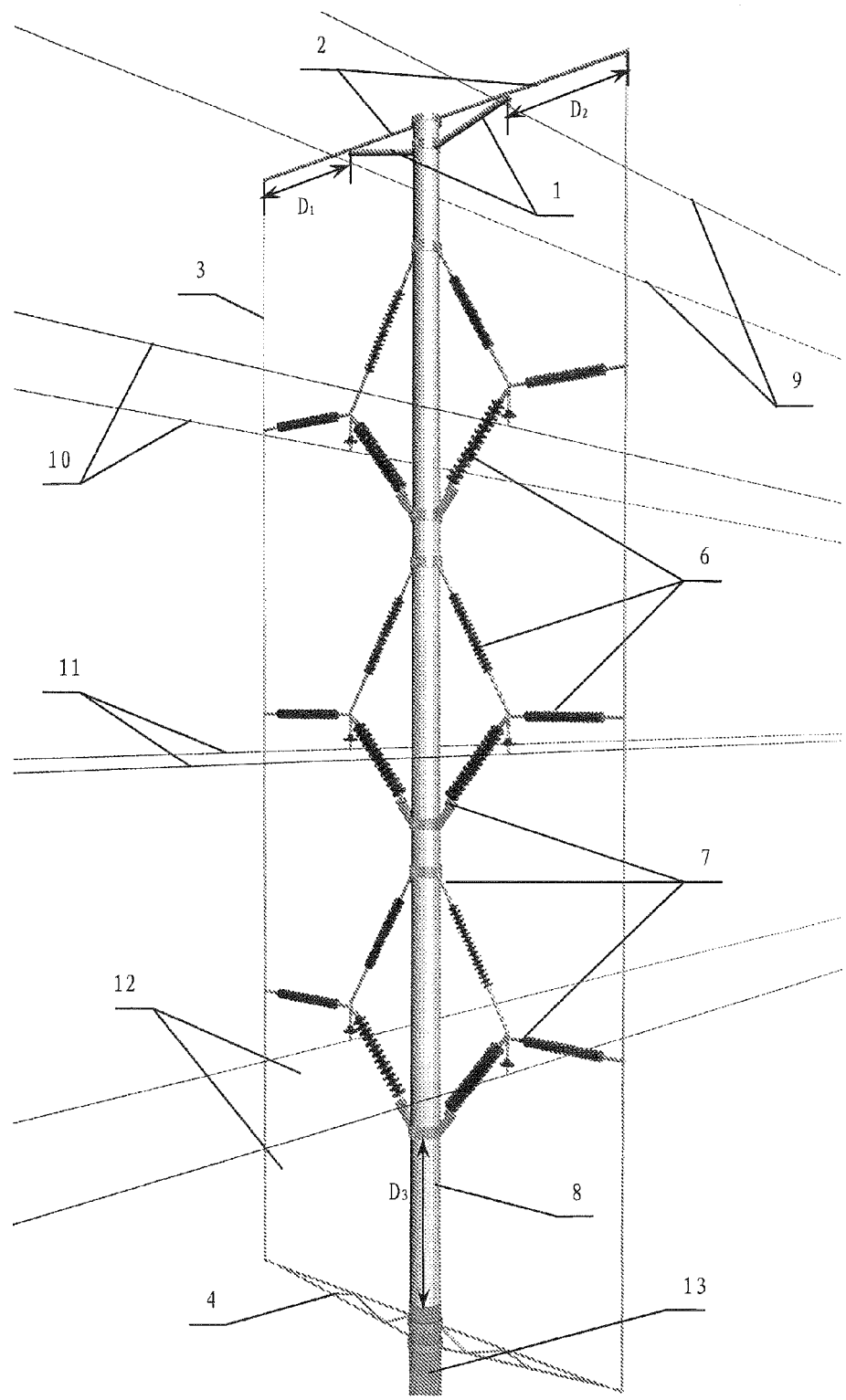
FIG. 3 is a front view of a pole tower using bilateral ground down-leading wire according to a second preferred embodiment of the present invention.
Figure 4:
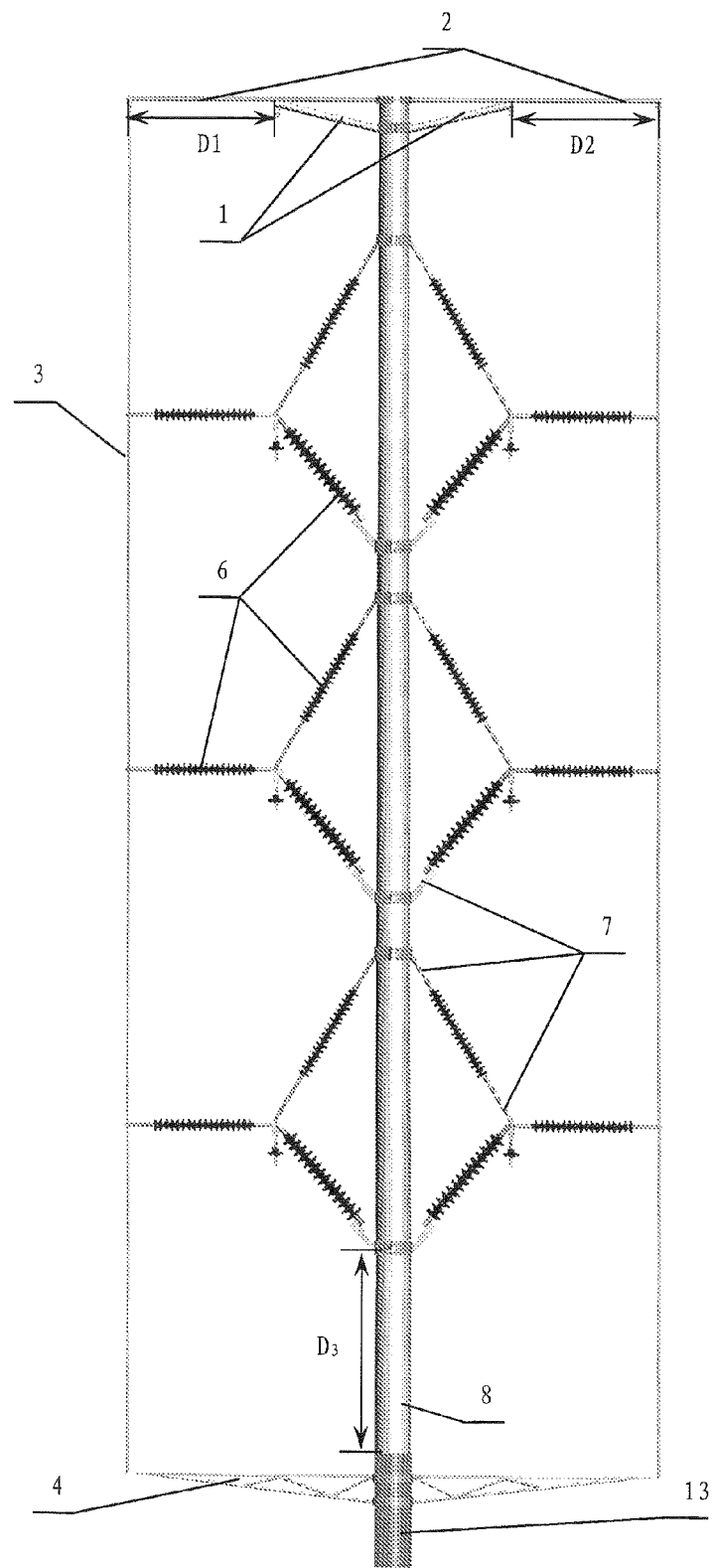
FIG. 4 is a perspective view of the pole tower according to the above second preferred embodiment of the present invention.

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Illustration of the symbols: 1—ground wire cross arm, 2—upper metal cross arm, 3—ground down-leading wire, 4—lower metal cross arm, 5—composite insulator, 6—cross arm metal member, 7—body of tower head, 8—ground wire, 9—proximate lead, 10—distal lead, 11—lower lead, 12—lower portion of tower body, 13—lower portion of tower body.

According to a preferred embodiment of the present invention, an upper metal cross arm 2 is extended from an extended line of one side of a ground wire cross arm 1, a ground down-leading wire 3 is vertically extended from a distal end of the upper metal cross arm 2, wherein a minimum distance of space between the ground down-leading wire and a proximate current lead 9 is $D_1$ (value of $D_1$ is calculated out according to requirement of lightning protection). The ground down-leading wire 3 is connected to the pole tower via a lower metal cross arm 4 at a distance under a lower current lead 11 of the pole tower.

Alternatively, two upper metal cross arms 2 are extended from extended lines of two sides of a ground wire cross arm 1 respectively (a length of the left ground down-leading wire is $D_1$ and a length of the right ground down-leading wire is $D_2$, wherein values of $D_1$ and $D_2$ are calculated out according to requirement of lightning protection), wherein two ground down-leading wires 3 are vertically leaded down from a distal end of the two upper metal cross arms 2 respectively. The ground down-leading wires 3 are connected to the pole tower via two lower metal cross arms 4 respectively at a distance $D_3$ under a lower current lead 11 of the pole tower.

Since the body of tower head uses composite material, the width of the transmission corridor is not determined by insulating requirement between the electric line and the earth, but just be controlled by insulating requirement between the two parallel electric lines at a same height, so that the width of the transmission corridor is greatly decreased. Because the ground down-leading wires are not connected to the tower body, so that the ground down-leading wires are prevented from short-circuiting with the tower body of the composite pole tower, so that advantage of the insulating property of the composite material of the pole towers is realized, and distance of the current lead climbing from the earth is increased, so that the ability of avoiding influence of pollution flashover is enhanced.

It is worth to mention that the length of $D_1$ and $D_2$ can be adjusted to obtain a desire minimum space distance between the ground down-leading wire and the proximate current lead according to frequency of lightning in the region of the transmission line, so that lightning outage rate of a single line is controlled. And lightning outage rate at double parallel lines has relation with the width of transmission corridor.

When the ground down-leading wires 3 are connected to the pole tower via two lower metal cross arms 4 respectively, each of the ground down-leading wires is grounded along the tower body of the pole tower, wherein when the tower head of the pole tower is made of composite material and the rest portion the tower body is a metal pipe, the ground down-leading wire can be directly connected to the metal pipe via the lower metal cross arm 4 which is connected to the metal pipe, and thus the ground down-leading wire can be grounded to the earth via the metal pipe. Therefore, the ground down-leading wires are not vertically pulled out to be standing at a position above surface of the earth, so that inconvenience to daily life of people is prevented.

The upper metal cross arms 2 and the lower metal cross arms 4 also pull ad support the vertical ground down-leading wires 3, so that the ground down-leading wires 3 are not easy to bend when suffering impact from wind. The ground down-leading wires 3 preferably uses conductor of high intensity and not easy to deform. In order to make sure the ground down-leading wires 3 be not easy to deform, supporting insulating arms may be provided to separate and support the two ground down-leading wires 3 with the composite pole tower. Alternatively, composite insulators may be employed to separate and support the two ground down-leading wires 3 with the composite pole tower.

In a word, method for vertically grounding and leading down form an outer side of a composite pole tower of the present invention is simple and easy to achieve. In comparison with grounding with ground down-leading wires at two sides of the pole tower, it is more material-saving and economical to use grounding with ground down-leading wires at one side of the pole tower. However, when grounding with ground down-leading wires at one side of the pole tower, the width of the transmission corridor is limited by the lightning outage rate at double parallel lines, so that the width may be not suggested be compressed to the utmost limit.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for vertically grounding and leading down form an outer side of a composite pole tower, wherein said method comprises the following steps:
   extending an upper metal cross arm from an extended line of at least one side of a ground wire cross arm,
   vertically leading down a ground down-leading wire from a distal end of said upper metal cross arm,
   connecting said ground down-leading wire to said pole tower via a lower metal cross arm at a distance under a lower lead, and
   grounding said ground down-leading wire along a tower body of said pole tower, wherein when an lower portion of said tower body is a metal pipe, said ground down-leading wire is selectively directly connected to said metal pipe via said lower metal cross arm, wherein said ground down-leading wires and said tower body are supported therebetween by at least an insulating arm or a composite insulator, so that said ground down-leading wires are not easy to bend nor deform when suffering impact from wind during operation.

2. A composite pole tower which grounds from an outer side thereof, comprising:
   a tower body,
   a ground wire cross arm,
   an upper metal cross arm extended from an extended line of at least one side of said ground wire cross arm, a ground down-leading wire vertically extended from a distal end of said upper metal cross arm,
   a lower metal cross arm, wherein said ground down-leading wire is connected to said pole tower via said lower metal cross arm at a distance under a lower current lead of said pole tower, wherein said ground down-leading wire is grounded along said tower body of said pole tower, wherein when an lower portion of said tower body is a metal pipe, said ground down-leading wire is selectively directly connected to said metal pipe via said lower metal cross arm, and
   at least an insulating arm or a composite insulator support between said ground down-leading wires and said tower body.

* * * * *